May 2, 1961 G. DIRKS 2,982,951

METHOD AND MEANS FOR CONVERTING SIGNALS SYMBOLIZING INFORMATION IN ONE SYSTEM OF REPRESENTATION TO SIGNALS SYMBOLIZING THE SAME INFORMATION IN ANOTHER SYSTEM OF REPRESENTATION

Filed March 30, 1955 6 Sheets-Sheet 1

INVENTOR
Gerhard Dirks
BY Michael S. Striker
agt.

METHOD AND MEANS FOR CONVERTING SIGNALS SYMBOLIZING INFORMATION IN ONE SYSTEM OF REPRESENTATION TO SIGNALS SYMBOLIZING THE SAME INFORMATION IN ANOTHER SYSTEM OF REPRESENTATION

Filed March 30, 1955

INVENTOR
Gerhard Dirks
BY Michael S. Striker
agt.

May 2, 1961 G. DIRKS 2,982,951

METHOD AND MEANS FOR CONVERTING SIGNALS SYMBOLIZING INFORMATION IN ONE SYSTEM OF REPRESENTATION TO SIGNALS SYMBOLIZING THE SAME INFORMATION IN ANOTHER SYSTEM OF REPRESENTATION

Filed March 30, 1955 6 Sheets-Sheet 3

INVENTOR
Gerhard Dirks
BY
Michael S. Striker
agt.

INVENTOR.
Gerhard Dirks
BY
Michael S. Striker
Attorney

May 2, 1961 G. DIRKS 2,982,951

METHOD AND MEANS FOR CONVERTING SIGNALS SYMBOLIZING INFORMATION IN ONE SYSTEM OF REPRESENTATION TO SIGNALS SYMBOLIZING THE SAME INFORMATION IN ANOTHER SYSTEM OF REPRESENTATION

Filed March 30, 1955 6 Sheets-Sheet 5

INVENTOR
Gerhard Dirks
BY
Michael S. Striker
agt.

May 2, 1961 G. DIRKS 2,982,951

METHOD AND MEANS FOR CONVERTING SIGNALS SYMBOLIZING INFORMATION IN ONE SYSTEM OF REPRESENTATION TO SIGNALS SYMBOLIZING THE SAME INFORMATION IN ANOTHER SYSTEM OF REPRESENTATION

Filed March 30, 1955

6 Sheets-Sheet 6

INVENTOR
Gerhard Dirks
BY
Michael S. Striker
agt.

United States Patent Office 2,982,951

Patented May 2, 1961

2,982,951

METHOD AND MEANS FOR CONVERTING SIGNALS SYMBOLIZING INFORMATION IN ONE SYSTEM OF REPRESENTATION TO SIGNALS SYMBOLIZING THE SAME INFORMATION IN ANOTHER SYSTEM OF REPRESENTATION

Gerhard Dirks, 44 Morfelderstrasse, Frankfurt am Main, Germany

Filed Mar. 30, 1955, Ser. No. 498,055

Claims priority, application Germany Oct. 1, 1948

7 Claims. (Cl. 340—324)

This application is a continuation-in-part of application Serial Number 101,032, filed June 24, 1949, now abandoned.

This invention relates to means for converting signals symbolizing information in one system of representation to signals symbolizing the same information in another system of representation and is applicable inter alia to the converting of stored signals into impulse sequences for operating printing, typing, visual indication and other means. It may for example have the function of converting symbols, representing characters of any form including letters, numerals, commands and the like e.g. "A," "B," "a," "b," "1," "2," "!," "?," into sequences of signals which are e.g. adapted to control dot-and-line printers. Also instead of converting symbols for single figures, letters or other characters, the invention may have the function of converting into symbols according to the international teleprinting system, or into sequences of signals printable on dot-and-line printers the letters of e.g. entire syllables, words or series of words as in the abbreviating or stenographic system.

The invention aims in its broadest aspect, at converting signals in one system of representation to signals in another system of representation in which a converter adapted to produce all the signals in the second system is operated selectively by the signals of the first system which are to be converted.

More particularly the invention provides a means for carrying out the above conversion procedure wherein a single converter is provided having a cyclic operation, each cycle of which converts the signals for a number of denominations or columns simultaneously or columnwise. The converter may operate to supply pulse sequences for the operation of the printing elements of a parallel printer, or for linewise illumination of a cathode ray screen, or otherwise, for a mosaic representation of the character. The converter may operate directly or through an intermediate storage, and may for example be a contact converter, an inductive converter, a cross-field system, or of an optical character or otherwise.

According to another feature of the invention, the signals of the first system of representation are arranged within co-ordinated groups, and the character, which is to be symbolized in the second system of representation, is fed to the converter as a signal identifying the position of the character in its group and a signal identifying the group One embodiment of apparatus according to the invention comprises a means for converting signals representing printable characters into pulse sequences for the operation of parallel printers on the dot-and-line principle, comprising a series of parallel printing levers movable collectively through a series of printing positions, electromagnetic means for each lever for effecting printing in any one of such positions, a selector providing the pulse sequences for printing any one of a predetermined set of characters by means of any lever, and signal input means determining what pulse sequences shall be fed to each electromagnet to effect printing of the corresponding characters by the respective levers.

Representative examples of the invention are illustrated in the accompanying drawings, wherein.

Figures 3A, 3B, 3C:
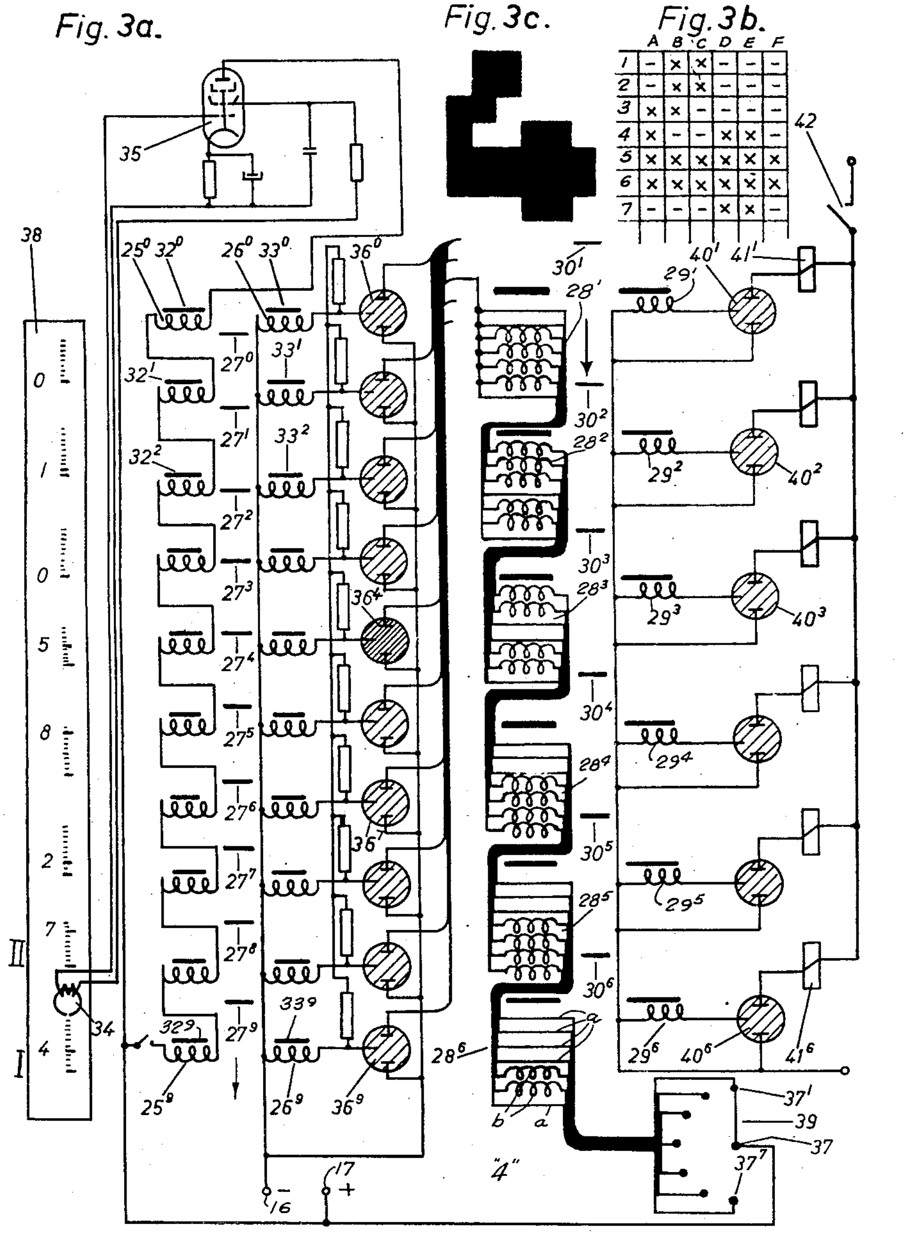
Figure 3D:
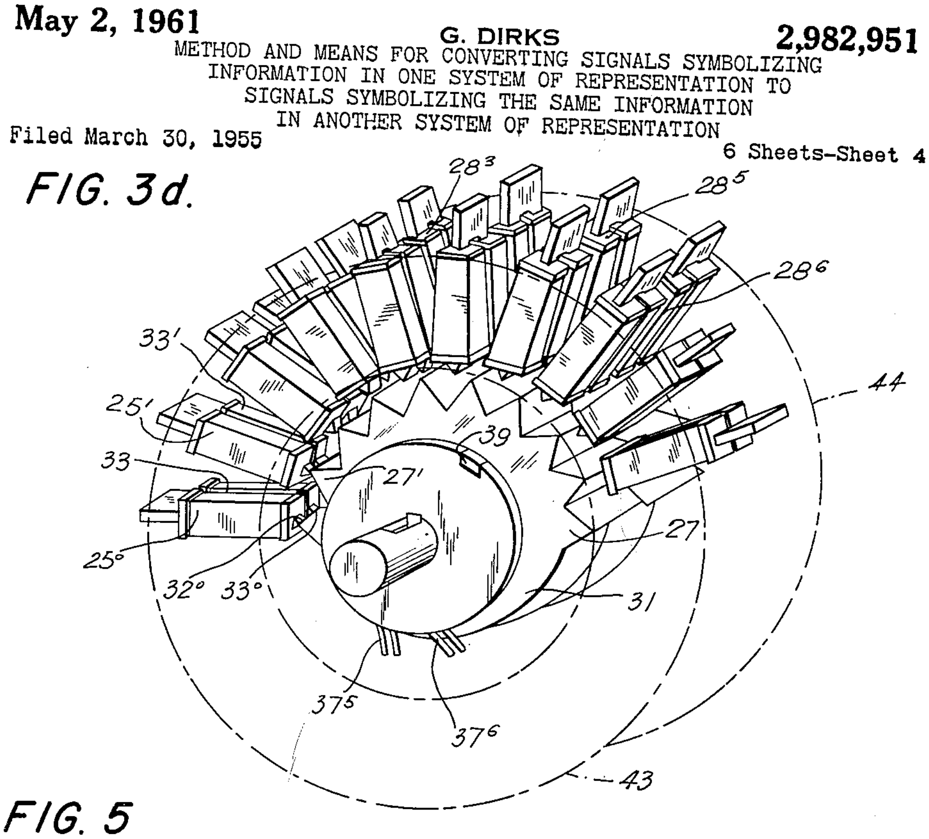
Figure 5:
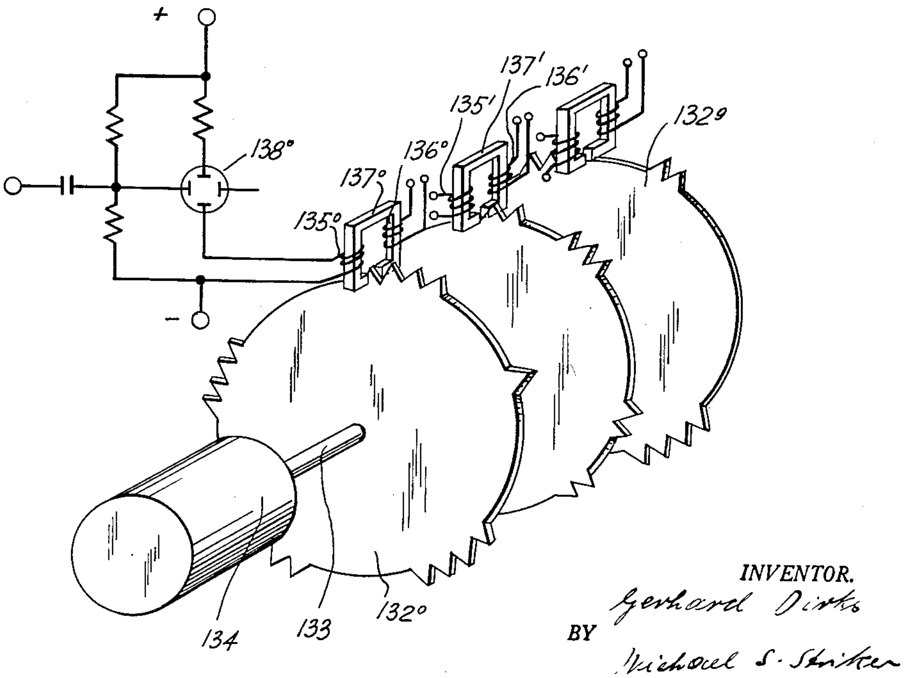
Figure 4A:
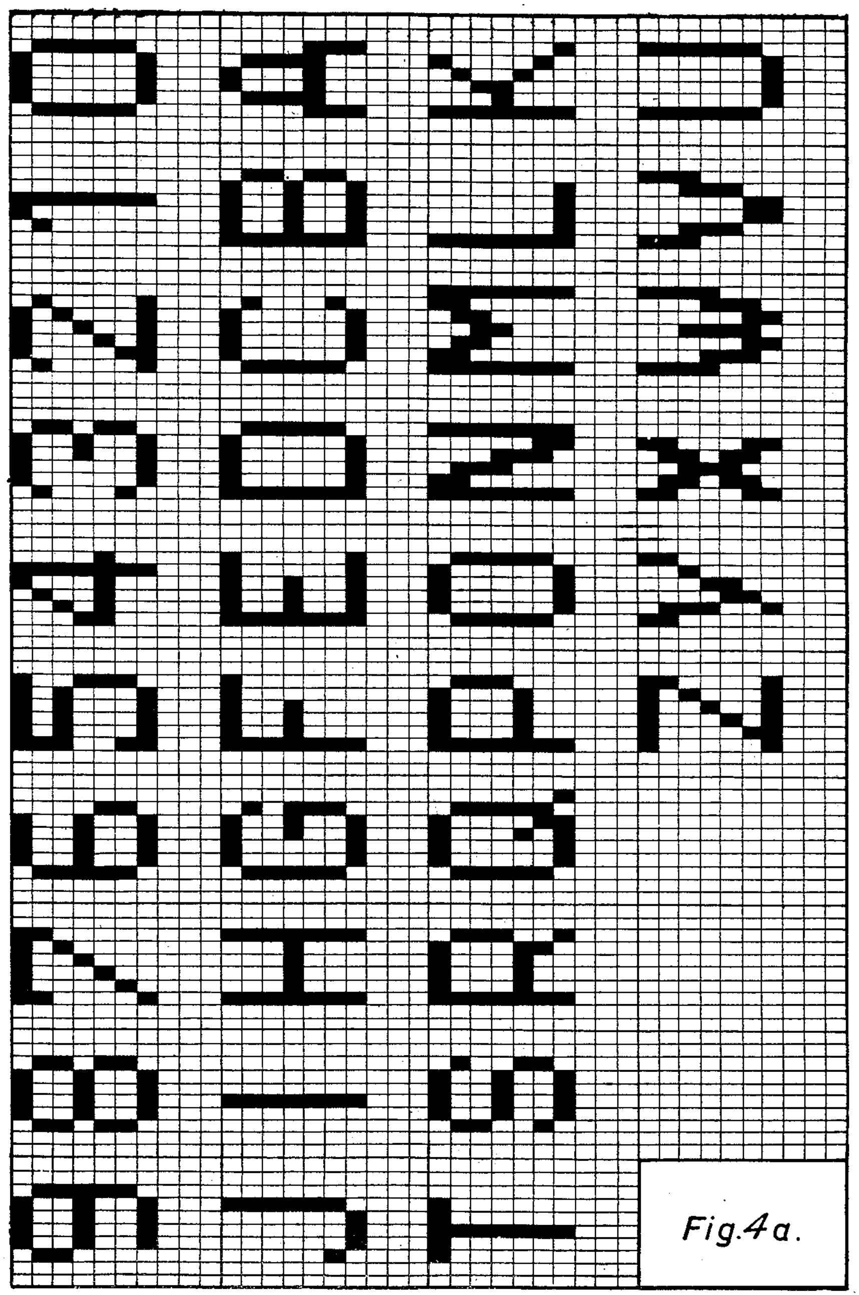
Figure 4B:
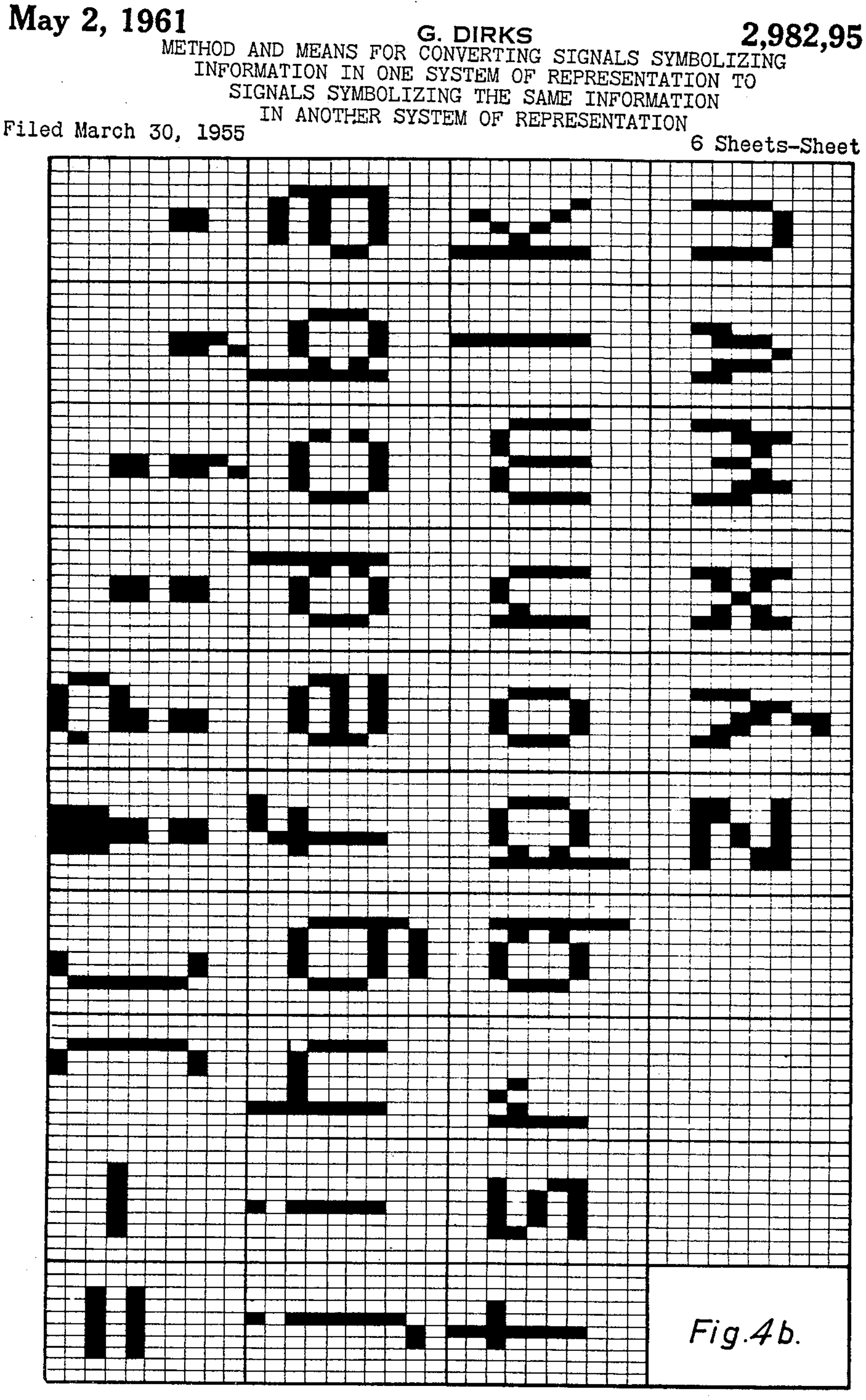

Fig. 3*a* is a diagram illustrating one arrangement for converting signals by inductive means;

Fig. 3*b* shows the arrangement of fields in one part of the distributor shown in Fig. 3*a* for indicating the character "4";

Fig. 3*c* shows the character "4" as an example of the mosaic printing and mosaic visual indications thereof;

Fig. 3*d* is a perspective view of an inductive distributor capable of operation in an arrangement according to Fig. 3*a*;

Figs. 4*a* and 4*b* show the arrangement of mosaic characters in co-ordinated groups; and Fig. 5 is a diagrammatic perspective view illustrating conversion by rotating magnetic elements generating pulse sequences.

Figure 1:
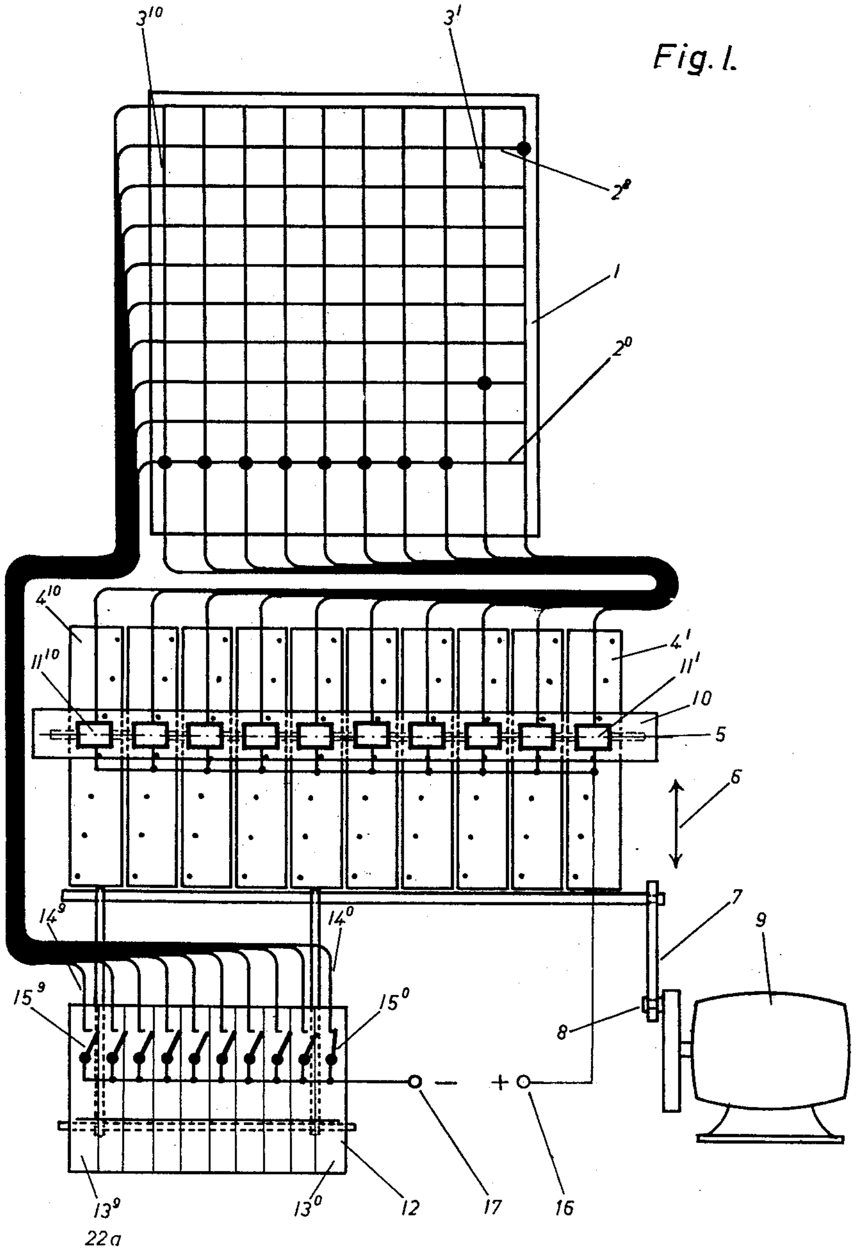
Fig. 1 is a diagram illustrating one arrangement for converting signals from a full keyboard into sequences for the operation of multi-column dot-and-line printers.

Referring first to Fig. 1, this shows how multi-column dot-and-line printers may be controlled with or without intermediate storage means between the input and the converter.

In this arrangement a central converter e.g. in the form of stencil plates, contact distributing rings or the like, is provided, providing the necessary signal sequences for all the characters (i.e. numerals in this example) which may be printed, and passing them to contact bars, connections or the like. These contact bars, connections or the like, cause a selectively controllable feeding of the signals to the printing coils of each column. By means of these signals the printing or indication of the character is effected.

The embodiment illustrated in Fig. 1 is of the contact distributor type, supplying the printing signal sequences for digits 0–9. A full keyboard 1 is provided, containing the horizontal contact bars $2^{0-9}$, and the vertical contact bars $3^{1-10}$. The selection of the printing signal sequences for the different denominations, e.g. the signal sequences for the printing of the figures "2" and "8," is effected by the key board and the association with the different printing units is determined in establishing connections between the horizontal bars $2^{0-9}$ and the vertical bars $3^{1-10}$ by means of contacts, in the example illustrated by pressing down the keys "2" and "8" of the digits "2" and "8" for the number "28."

The different printing columns are printed by means of a dot-and-line printer comprising ten parallel printing levers $4^{1-10}$. Each of these printing levers is rotatably mounted on shaft 5 and together with the shaft executes a to and fro movement in arrow direction 6 under control of driving means in the form of a connecting rod 7 driven by the crank 8. Said crank is driven by a motor 9.

On the face of said levers 4, each lever having a width of a character, e.g. 2.6 mm., dot-like elevations are provided (printing points) each being spaced longitudinally from the other by the height of a character and, in transverse direction, by a seventh of the width of a character, the character being considered as made up of seven strips. Examples of printing devices operating on these lines are shown in my co-pending applications No. 432,294, filed May 25, 1954, now abandoned, No. 432,292, filed May 25, 1954, now abandoned, and No. 432,297, filed May 25, 1954, now Patent No. 2,899,892.

Naturally, other types of dot-and-line printers may be adopted.

The printing levers 4 print in dependence on the control magnet arrangement 10 containing, for each printing lever one printing magnet, respectively $11^{1-10}$, which magnets do not attract the corresponding printing levers, if a dot or part of a line is to be written at that point. A printing ribbon is placed between the levers 4 and the paper to be printed upon. The levers $4^{1-10}$ are separately spring mounted to remain in the lower position if not attracted by the corresponding printing magnets $11^{1-10}$, and consequently print at those points, the printing being prevented or interrupted only by the attraction of the lever to a magnet.

Fig. 1 shows also the central converter 12, the control segments $13^{0-9}$ being disposed side-by-side and all connected with shaft 5 for reciprocation therewith and furnishing simultaneously the signal sequences for the figures 0–9 to the circuits $14^{0-9}$. The control segments 13 are provided either as separate bars, or as parts of a single plate having different rows of depressions or elevations controlling the operation of the contacts $15^{0-9}$. Each segment controls the contacts for one digit.

When driven with a to and fro movement the segments 13 cause these contacts $15^{0-9}$ to furnish the signal sequences to the different printing circuits $14^{0-9}$ for the digits 0–9. The signal sequences are provided by the completions of the circuit to D.C. supply source terminals 16 and 17 through closure of the contacts $15^{0-9}$. Said segments $13^{0-9}$ may be provided with depressions joined by a guiding groove for a ball operating to close or open the contacts $15^{0-9}$ according to whether the ball is located in a depression or not.

Obviously, many variations are possible regarding the form of the realization of said contacts. A non-metallic plate may operate the contacts directly through said ball or a metallic plate may operate said contacts through an intermediate insulating element, or the ball may directly make contact with a spring-mounted contact, which has a limited travel. In all these variations the ball providing the contact is retained by means of a cage. Instead of a ball a roller may be used.

In a modification, instead of the reciprocating flat plates or bars comprising the converter 12, a rotary drum may be used, its rotation being synchronized with the to and fro movements of the printing elements. In such a case, by dividing the drum surface into different areas, different signal sequences can be transmitted for each to and fro movement of the printing levers. For example, one quarter of the circumference could carry representations of the signals for digits of numbers, the next quarter would carry representations of the signals for the letters a–k, the next the representations of the signals for the letters l–s, and the last the representations of the signals for the letters t–z, and punctuation marks. In this case also, the key board 1 would need additional rows of keys for indicating for which quadrant of the converter the signals are to be effective for conversion.

With such an arrangement the rotation of the drum would be at half the speed of the crank 8 so that the four segments would be operative in turn during two to-and-fro strokes of the printing lever.

Figure 2:
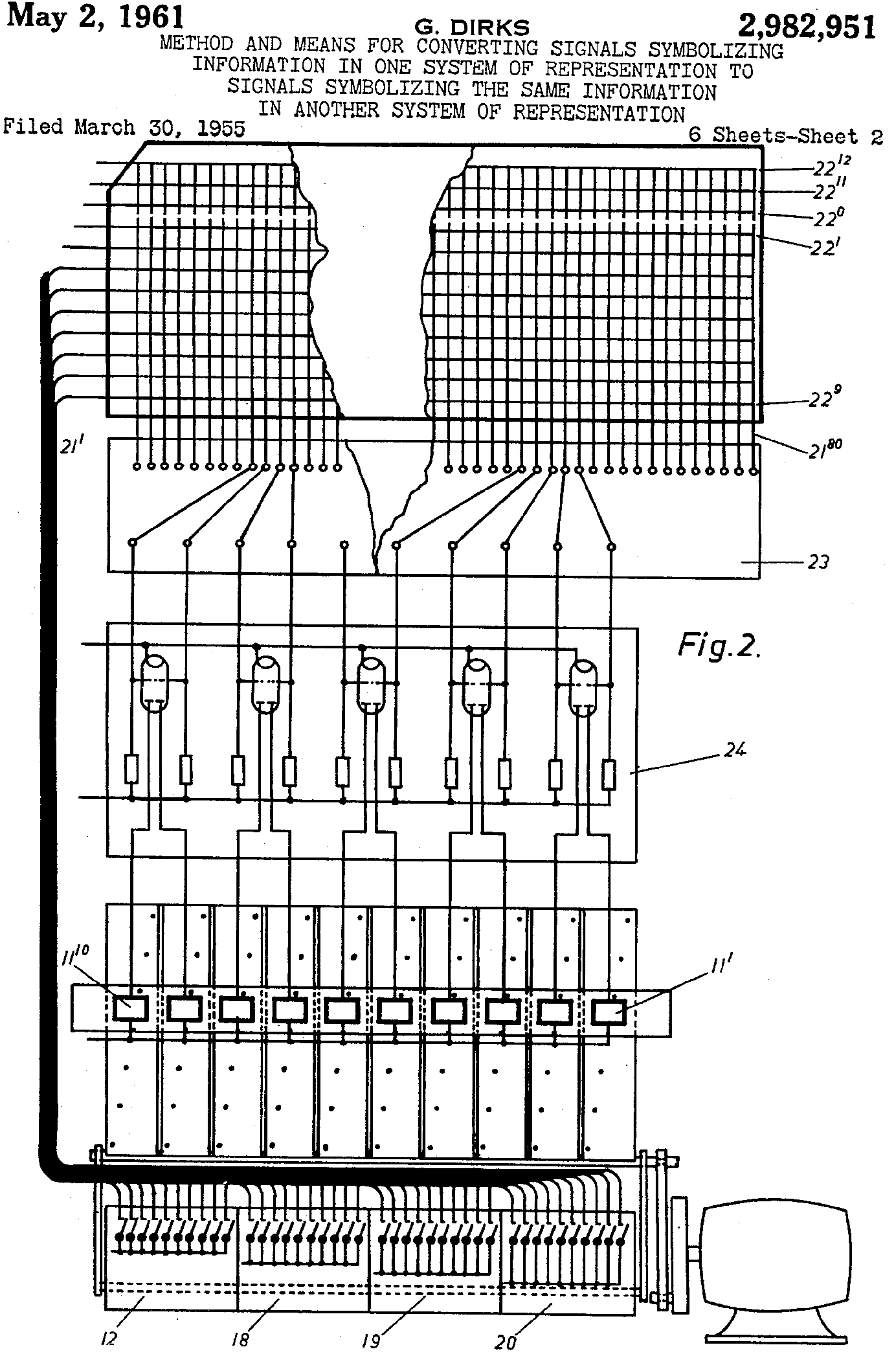
Fig. 2 is a view similar to Fig. 1 but of an arrangement operated from punched cards or the like and showing also amplifying means for the sensed signals.

A similar arrangement is represented in Fig. 2 in which however the central converter used is adapted both for digits and for letters. In this case the converter element provided for digits is again shown as a plate 12, whereas the converter elements provided for the first group of letters and selected by means of an additional hole $22^0$ in the punched card 22a are represented by the plate element 18, those for the next group of letters are selected by means of an additional hole $22^{11}$ in the form of plate 19, and for the last group of letters selected by means of an additional hole $22^{12}$ in the form of the plate 20. Instead of side-by-side elements 12, 18, 19, 20, four segments of a drum surface could be used as referred to in connection with Fig. 1.

In Figure 2, an electric punched card sensing means is shown (instead of the full key board 1 of Fig. 1) which card is represented by the vertical rows $21^{1-80}$ and the horizontal rows $22^{0-9,\ 11,\ 12}$, the possible hole positions being indicated by the intersections of said rows. Switch connections between the different columns of the punched cards and the printing devices in different positions may be effected by means of the plug board 23.

Operation of the different printing devices, which for the sake of clearness are limited to ten column positions, is effected by an amplifier 24 containing electronic tubes controlled by means of the central contact converter. According to the illustration, the grids of double-triodes are controlled, each grid being associated with a different column. Instead of double-triodes, thyratrons may be used in the amplifier 24. The printing magnets $11^{1-10}$ of the different printing positions are connected in the anode circuits of the respective tubes.

Referring now to Figs. 3*a* to 3*d*, an inductive converter will be described which may be used as a converter for one column as well as a central converter for multi-column arrangements. The whole apparatus is designed for translating single pulses respectively representing individual characters (e.g. letters, figures, etc.) into trains of output pulses respectively corresponding to positional elements of a matrix-type pattern (as exemplified by Fig. 3*b*) composed of rows and columns containing such elements (symbolized by crosses in Fig. 3*b*), the entirety of such elements corresponding to a train of output pulses which then constitute the representation of a particular character, as e.g. the figure "4" (Fig. 3*c*).

In a plurality of sets of inductive transducer units, of which each set is provided for one of the characters to be represented, each unit is associated with one of the columns, respectively, of the matrix-type pattern and comprises a core member and coil means thereon energizable by a signal pulse (character pulse), one or more windings constituting each coil means. The number of windings in each unit corresponds to the number of positional elements required in the respective column of the particular character representation. Those windings which in each set of units are associated with the positional elements required in each row of the matrix, are connected to constitute winding combinations the sequential energization whereof furnishes signals necessary for the indication of a particular character in the matrix-type pattern.

The particular embodiment of a converting device shown in Fig. 3*a* may be used as a connecting link for dot or line printers in connection with the computing apparatus referred to above, or for other computing apparatuses, storage apparatuses or the like. In this example, the signal input device comprises coils $25^{0-9}$, $26^{0-9}$ disposed in pairs around the periphery of a toothed wheel (magnetic yoke wheel) 31 (see Fig. 3*d*). The angular spacing of the teeth on the wheel 31 differs by one tooth from the angular spacing of the coils in the sets, so that a semi-circle of the toothed wheel has for example 10 teeth $27^{0-10}$, whereas in the case of the coil sets an angle of 162° is divided into 10 equal parts consequently, on rotation of the toothed wheel 31 in counterclockwise direction, a momentary position for instance of the edge of tooth $27^0$ opposite the edges of the cores $32^0$ and $33^0$ of the coils $25^0$ and $26^0$, as shown in Fig. 3*d*, will occur at a given moment.

During the next fractional movement, the tooth $27^1$ will move into a position opposite the edges of the cores $32^1$ and $33^1$ of the coils $25^1$ and $26^1$, and during the next following fractional movement the edge of the tooth $27^2$ will move into position opposite the edges of the cores $32^2$ and $33^2$ of the coil set $25^2$ and $26^2$ and so on. Due to the vernier-like relation between the spacing of the teeth $27^{0-10}$ and the spacing of the coil pairs $25^{0-9}$, $26^{0-9}$, a comparatively small rotational movement of wheel 31 will result in a rapid sequence of conditions of alignment between consecutive teeth and consecutive coil pairs.

The coils are fixed mechanically by means of two pairs of brass rings 43 and 44. Single input signal pulses are applied sequentially to the whole set of series-connected coils $25^{0-9}$ from the pick-up head 34 via tube 35, the character representing signals being stored as shown in Fig. 3*a* by marks indicating the stored digit or character in question, for instance the figures 4, 7, 2, 8, 5, 0, 1, respectively recorded in successive sectors I, II . . . of the magnetic storage 38 for example a rotating magnetic record carrier synchronized with the rotation of toothed wheel 31. It can be seen that in each sector I, II . . . 10 possible positions for a signal record are provided, and that the position of each recording mark within the 10 possible positions gives the recorded signal pulse its significance. In each pair of coils, the primary coil 25 can be magnetically coupled with the associated coil 26 by one of the teeth 27 acting as a magnetic yoke. Thus, when a pulse representing a character, e.g. "4" in sector I is picked up and transmitted to the set of primary coils $25^{0-9}$, this pulse will be inductively transferred to the proper secondary coil $26^4$ only if synchronously with the pickup of "4" the yoke $27^4$ is positioned in register with the tips of the cores $32^4$ and $33^4$. The vernier-like difference between the angular spacing of the teeth 27 on wheel 31 and that of the coils $25^{0-9}$ has the advantage to permit with this arrangement a comparatively large clearance between the coils in spite of the rather narrow spacing of the possible signal positions on the magnetic record carrier 38, especially if the coils and the teeth are arranged around the entire periphery. By means of this arrangement all the sectors I, II . . . of the record carrier 38 are sensed successively in the course of one rotation of the wheel 31, because the sensing of one sector with all its signal positions takes place during the period between the passage of the edge e.g. of the tooth $27^0$ of the toothed wheel 31 past the edges of the cores $32^0$ and $33^0$, or the passage of the tooth $27^1$ past the edges $32^0$ and $33^0$ etc., so that all coil pairs $25^{0-9}$, $26^{0-9}$ are being passed, during this sector sensing period, successively by the respective teeth $27^{0-9}$ of the toothed wheel 31.

As intimated above, the character representing signals of the signal carrier 38 are sensed by means of the signal pick up head 34 and amplified by the pentode 35. The windings of the primary coils $25^{0-9}$ are connected together in series within the plate circuit of the pentode 35.

A pulse induced in the manner described above in any one of the secondary windings $26^{0-9}$ ignites the respectively associated gas discharge tube $36^{0-9}$, for example in the case of the input signal "4", the gas discharge tube $36^4$. The tubes $36^{0-9}$ constitute the output ends of the signal input means of the illustrated arrangement. The following description concerns the actual inductive converter device. This device comprises a plurality of sets of inductive transducer units, each set being associated with one of the characters to be represented, only one set for the character "4" (Figs. 3*b*, *c*) and composed of units $28^1$–$28^6$ being shown in Fig. 3*a*. Each unit comprises coil means wound on a core, as shown in Figs. 3*a* and 3*d*, one core for all coil means associated with a particular column. Each of the coils of the units $28^{1-6}$ comprises a plurality of windings connected in parallel with an associated one of the discharge tubes $36^{0-9}$ of the input means. According to the number and distribution of the positional elements required to represent a character or the like in the column-and-row pattern (Fig. 3*c*), the sets of coils $28^{1-6}$ contain, each associated with one column, respectively, a predetermined number of windings *b* energizable by an input signal pulse from the associated tube 36. Each winding is associated with a particular row of the matrix pattern. All those windings which, in the units $28^{1-6}$, are associated with a particular row are connected in series to constitute a winding combination representing the positional elements required at the intersections of that row with the various columns for representing the particular character. Where in that row no positional element is required in a column, in the respective column-representing unit a non-inductive wire *a* is used instead of a winding *b*, and such wires *a* are included in said winding combination for connecting the respective windings *b* in series. As an example, Fig 3*a* shows the diagram of windings *b* and wires *a* in the various units $28^{1-6}$ as required for producing the pattern of elements shown in Fig. 3*b* for the digit "4" shown in Fig. 3*c*.

A rotary selector switch 37 is provided with seven contact positions $37^{1-7}$ over which moves a wiper arm 39. The arm 39 is operated together with the wheel 31 so that the arm 39 moves from position $37^1$ to position $37^7$ during the period in which one of the input tubes $36^{0-9}$ is energized, i.e. a particular character-representing input signal is being processed. The several contact positions are respectively connected to the corresponding winding combinations predetermined in the sets of coils of units $28^{1-6}$. For example contact position $37^1$ is connected to the first (uppermost) winding *b* or wire *a* in each set, $37^2$ is connected to the second winding *b* or wire *a* of each set, and so on. It must be understood that in each position there is established across the various coil sets either a direct connection *a* or an inductive winding *b*. For the representation of different characters, different combinations of windings in each set of transducer units would be provided.

In the particular example illustrated, the unit $28^1$ contains, in accordance with the diagram of Fig. 3*b*, the windings *b* required for the positional elements in the first vertical column A of the digit "4" and occurring only in the rows 3, 4, 5, 6. Therefore, in the coil unit $28^1$ in Fig. 3*b* in the first and second winding combination, two wires *a* provide only a direct connection and therefore correspond to the fields marked by a stroke at the intersection of rows 1 and 2 with column A in Fig. 3*b*, whereas the third to the sixth fields indicated by a cross in the vertical column A correspond to the effective windings *b* of unit $28^1$ and the seventh field of column A in row 7 corresponds again to a direct connection wire *a* at the bottom of unit $28^1$ as shown. The second vertical column B of Fig. 3*b* is represented accordingly by the set of windings in unit $28^2$, the third column C by the set of windings in unit $28^3$, and so on.

The windings of each winding combination in each set of transducer units $28^{1-6}$ are excited by means of the current from the discharge tubes $36^{0-9}$. The winding combinations of each set of transducer units $28^{1-6}$ are connected in parallel at one end thereof, i.e. at the input of the first unit $28^1$, as shown, and thus jointly connected with the output of the associated discharge tube 36. In the example, the set of units representing "4" is connected to tube $36^4$. The other ends of the winding combinations appearing in the last unit $28^6$ are connected, respectively, with the switch contacts $37^{1-7}$.

A comparison of the horizontal rows of the diagram of Fig. 3*b* with the core means of units $28^{1-6}$ of Fig. 3*a* shows that the first inductive or non-inductive elements *a*, *b* of said units $28^{1-6}$ collectively correspond to the horizontal row 1 of the diagram Fig. 3*b*. Correspondingly, counting from the top down, the first element of the coil of unit $28^1$ is shown as a direct connection *a* corresponding to the stroke in the first field at the intersection of the horizontal row 1 with column A in Fig. 3*b*. The first elements of the coils of units $28^2$ and $28^3$ are industive windings *b*, corresponding to the positional elements represented by a cross in the second and third field at the intersection of the first horizontal row 1 with columns B and C, respectively of Fig. 3*b*. The three last fields of this horizontal row 1 are marked by a stroke and correspondingly the first elements of units $28^{4-6}$ are shown as direct connections *a*.

Figs. 3*a* and 3*d* show that every core carrying the coil means of transducer units $28^{1-6}$ associated with a particular column is magnetically coupled, whenever required, with a secondary cored coil $29^{1-6}$, respectively, so that whenever any one of the cores of the column-representing units $28^{1-6}$ is energized by an input signal pulse passing through the respective windings, a corresponding output pulse is inductively produced in the respective secondary coils $29^{1-6}$, which are also respectively associated with the columns.

It can be seen now that any single signal pulse furnished by the input means, e.g. tube $36^{4}$, is translated, depending upon the composition of series-connected windings in the column-representing transducer units of each set thereof, into sequences of parallel pulse groups, the sequence being determined by the operation of switch 39 causing a row-by-row readout of signals in columnwise distribution.

The control of a printer, without intermediate storage, by means of an arrangement of the above structure and function will be described in the following, the printer being for example provided for one printing column and printing the character in vertical direction and being arranged as dot printer with 6 levers controlled in parallel, as in my said applications No. 432,292, filed May 25, 1954, and No. 432,297, filed May 25, 1954. As described in these applications a character impression is built from a pattern of dots arranged in horizontal rows, the rows being printed successively. The dot printing levers are operated selectingly to produce dots in the required positions in each row. Thus, in printing the character 4, the first row contains two dots corresponding to the two crosses in the first row of Figure 3*b*, whereas the fifth row contains six dots corresponding to the six crosses in the fifth row of Figure 3*b*.

For simplifying the explanation of the operation of this arrangement, it will be assumed that the record carrier 38 carries only the signal "4" in only the sector I. The inductive converter described above may work in such a manner, that eight fractions of rotational movement (each corresponding to the movement of tooth $27^{0}$ (Fig. 3*d*) from opposite one pair of coils 25, 26 to the next pair) are necessary to represent a character, the first fractional rotation serving to admit a signal from the storage carrier 38 representing the particular character to be printed and the next seven fractional rotations occurring during the translation of that signal into pulse trains causing the progressive imprinting of dots in seven horizontal lines or rows disposed one beneath the other by means of six printing levers operating in parallel while the printing sheet is moved step-wise for producing the columns. In this manner it is possible to print in every full rotation, one character composed of correspondingly arranged dots. The sector I of the signal carrier 38, is sensed first during the first fractional rotation. After amplification by means of the pentode 35, of the signal "4" sensed by means of the sensing head 34, ignition of the gas discharge tube $36^{4}$ is caused in the manner described through the inductive distributor $25^{0-9}$ and $26^{0-9}$, because at the time when the signal "4" is under the sensing head 34, the yoke $27^{4}$ is opposite the coils $25^{4}$—$26^{4}$.

In the course of the second fractional rotation the switch arm 39 of the selector switch 37 makes contact for the duration of this fractional rotation with contact $37^{1}$. The first combination of windings of the units $28^{1-6}$ connected in series with tube $36^{4}$ and with the switch contact $37^{1}$, cause during this second fractional rotation an inductive energization of the secondary coils $29^{2}$ and $29^{3}$. No signals are induced in the coils $29^{1, 4, 5, 6}$ the uppermost elements in the respective primary coils of units $28^{1, 4, 5, 6}$ being a direct non-inductive connection within the respective winding combination and therefore ineffective. The discharge tubes $20^{2}$ and $40^{3}$ being connected with the coils $29^{2}$ and $29^{3}$, respectively, are therefore ignited during said fractional rotation by means of the pulse transmitted by the secondary coils $29^{2}$ and $29^{3}$, whereas the discharge tubes $40^{1, 4, 5, 6}$ are not ignited.

The magnetic coils $41^{1-6}$ of the printer which has to be controlled or, in a modified arrangement with indirect control, corresponding relays, are respectively arranged in the discharge circuits of the tubes $40^{1-6}$ the ignition of tubes $40^{2}$ and $40^{3}$ causing therefore the printing of the elements of the character 4 according to the first horizontal row 1 of the diagram in Fig. 3*b*, namely as they appear in columns B and C.

In the course of the third fractional rotation, the same operation is repeated with the switch arm 39 moved to contact $37^{2}$ and in this case the next combination of windings (which are shown as the second from the top) of the coils of units 28 cause the ignition of the gas discharge tubes $40^{2}$ and $40^{3}$ because in the winding combination now placed in circuit, inductive windings exist only in the coils of units $28^{2}$ and $28^{3}$ associated with columns B and C. Thus only the discharge tubes $40^{2, 3}$ are ignited also in this case, whereas the gas discharge tubes $40^{1, 4, 5, 6}$ are not ignited. Thus, only the magnetic coils $41^{2}$ and $41^{3}$ are energized, producing the dots in row 2, namely in columns B and C, as shown in Fig. 3*b*.

For each operation related to a fractional rotation, the gas discharge tubes $40^{1-6}$ are ignited separately, the tubes being extinguished by means of a contact switch 42 after each fractional rotation, said switch being operated in synchronism with the rotation of the toothed wheel 31.

In the course of the subsequent fourth fractional rotation, the input signal "4" is translated into pulses for printing the third horizontal line of the pattern Fig. 3*b*. Now the third combination of windings in the transducer units is effected via the contact $37^{3}$ of the switch arm 39 which renders inductively effective the windings *b* which are the third elements in the coils of $28^{1}$ and $28^{2}$, whereas in this winding combination in the other units $28^{3-6}$ no inductive windings exist, only connections *a*. Thus, two dots in row 3, columns A and B are printed. In the same manner, row-by-row, printing signals are supplied by the converter to the discharge tubes $40^{1-6}$ which, after eight successive fractional rotations of wheel 31, have printed, row-by-row, dots corresponding to the transmitted signal sequences for the corresponding character. Subsequently the process may begin analogously for a signal in sector II, the signals of digit "7" on the computing signal carrier 38 causing during the first fractional rotation of the second rotation of the toothed wheel 31 the ignition of the gas discharge tube $36^{7}$ causing the same process during the seven following fractional rotations as just described for the digit "4."

The current supply to the various winding combinations is not interrupted during the passage of the switch arm 39 from one contact position to another the arm making contact with a succeeding contact before it leaves the preceding contact; the current is therefore not interrupted and the gas discharge tubes $36^{0-9}$ are thus not extinguished during the movement of the arm 39 over contacts $37^{1-7}$ but these tubes are extinguished only when the printing of a character is terminated.

To indicate that a difference may exist between the time period for the operation of the mechanical printing arms, and the time period for the igniting and controlling processes by means of the converter, only a semicircle is shown occupied by teeth on wheel 31 in Fig. 3*d*. Feeding time is thus provided for the printing paper between the printing of successive characters.

For the sake of easier understanding of the invention the arrangement has been described for printing of a single character only. However in practical use a series of characters may be printed simultaneously, the upper row of elements or dots for all the characters of such series being printed during one cycle of operation, the second row for all the characters of the series being printed during a second operation, etc.

It is obviously possible, without changing the principle of the procedure, instead of using vertically moving printers and printing simultaneously horizontal rows of dots one beneath the other, to use horizontally operating printers comprising (for characters as in the present assembly, composed of elements according to Fig. 3*b*) seven printing levers printing horizontally in parallel. In this case seven pairs of coil means 28, 29 would be provided instead of 6 coil means.

In the diagrammatic representation of Fig. 3*d* ten of these pairs of coil means are provided, thus making it possible to convert character input signals by means of this converter into pulses producing characters composed of nine rows of elements and thereby permitting the reproduction for example of both capital and small letters. The switching processes are the same.

Instead of the just described direct control of a dot-and-line parallel printer by means of said converting means, the converter may, for increased efficiency, operate together with an intermediate storage means, for instance for the control of multi column dot-and-line printers. In this case the signal sequences of the one horizontal row after the other are recorded on the intermediate storage means. By this converting and storing, the gas discharge tube 36$^4$ is ignited in accordance with the signal "4" in sector I, and is extinguished at the end of sensing this sector. Thereupon, in sector II the signal "7" is sensed and after amplification through pentode 35 whereby the gas discharge tube 36$^7$ is ignited. The rest of the operation is analogous to that described with respect to Figs. 3*a*–3*d*.

The digit signals of all sectors provide therefore the recording of the first horizontal row of elements of the figures, letters or other characters, which have to be printed by a multi column printer according to my co-pending application No. 432,297, filed May 25, 1954, and No. 432,292, filed May 25, 1954.

During the second fractional rotation switch 39 has moved to contact 37$^2$. In this case the same cycle is repeated which has been described above for the recording of the printing pulse sequences of the first row of elements, except that during this rotation the printing of the second row of dots takes place. On the third rotation the third row of dots is printed and so on. Subsequently the operation of the printer can be controlled in conventional manner by the intermediate storage means.

While the above sections dealt with the conversion of figures into signal sequences adapted to be indicated and printed by dot and line printers, in the following the conversion of symbols for letters or other characters into signal sequences will be described by means of which these letters or characters may be represented by means of dot or line printers or cathode ray visual indicating means.

In Fig. 4*a* these mosaic outlines of the Figures 0–9 are shown in the left vertical row. The next vertical row shows the letters A–J and the third the letters K–T while the fourth shows the letter U–Z.

By this disposition of the characters a horizontal relation between the characters, for instance 0/A/K/U is indicated by symbolizing all these 4 characters by the fundamental symbol "0" with a supplementary signal according to the respective vertical row, for instance the supplement *a*, *b*, *c*, *d*. The character "0" is indicated by symbol 0–*a*. The addition of a supplemental symbol *b* to the basic symbol 0 (symbol 0–*b*) results in the signification of A; the addition of symbol *c* to basic symbol 0 gives the symbolizing of K, and the addition of symbol *d* to basic symbol 0 gives the significance of U. If a further supplementary symbol *e* is used (Fig. 4*b*), the "period" is represented by 0–*e*, and the addition of the symbols to the basic symbols 0–9 gives the signification of the lower case characters of the row a–j instead of a symbol in the row of capital letters A–J. The addition of the symbol *f* instead of *c* to the basic symbols 0–9 gives the signification of the lower case characters in row k–t (Fig. 4*b*) instead of the capital letters K–T. Finally the addition of *g* to the basic symbols 0–9 indicates the small letters u–z instead of the capitol letters U–Z. The addition of the supplementary symbol *e* to the basic symbols 0–9 indicates the respective punctuation marks . , ; : ? ! ( ) - = (Fig. 4*b*).

Referring now to Fig. 5, the converting device therein shown differs from the contact converting device and the converting by means of coils already described, in that its coils comprise no windings co-ordinated to the printing signal sequences, and no connection by means of contacts is provided.

The variation of the magnetic field is provided in contrast to the above described methods by varying the magnetic circuit linking a primary and a secondary coil by means of discs shaped in correspondence to the desired printing signal sequences. This variation may also be sensed by means of magnetic sensing heads.

An embodiment of a converting device according to this method is shown by way of example in Fig. 5. Rotatable discs 132$^{0-9}$ on a shaft 133 driven by means of motor 134 are provided as converting elements. They are, for instance, stamped from sheets or blanks and are provided with teeth corresponding to the pulses required for producing the shape of the characters.

Around the periphery of the discs 132 primary and secondary coils 135 and 136 are arranged, respectively on open iron cores 137, the magnetic circuits of which are closed by the teeth of the discs as they pass through the gaps of the respective cores. The primary windings 135$^{0-9}$ of the coil systems are energized by means of the ignition of the respective gas discharge tube 138$^{0-9}$ (compare with tubes 36$^{0-9}$ in Fig. 3*a*). The teeth of the rotating discs 132, traversing the magnetic fields of the excited primary coils 135$^{0-9}$, induce signals in the respective secondary windings 136$^{0-9}$.

Thus, by means of the circumferential form of the individual discs computing signals for example may be converted into printing signals or into whatever other signals are desired. The ignition of the gas discharge tube 138$^0$ exciting the primary winding 135$^0$ signifies for instance a "0," an excitation of coil 135$^1$ by means of the gas discharge tube 138$^1$ (not shown) signifies a "1," and so on.

The use of the converter shown in Fig. 5 as a single central converter for several denominations is also possible. In this case the control by the different discs is eliminated. Each of the discs 132 feeds signals to a common bar, similarly for example to the elements 13$^{0-9}$ in Fig. 1, and, from which the contact sequences may be used for the control for instance of a multi-column printer. Instead of slotted or toothed or other shaped iron discs, circular discs of non-magnetic material may be used containing magnetizable parts or magnetized parts at the places where completion of the magnetic field is to be effected.

What I claim is:

1. An inductive signal translater device, comprising, in combination, a primary circuit arrangement including, in series, input means for supplying an input signal, magnetizable core means, first coil means operatively connected with said input means for energization thereby and mounted on said core means for magnetizing the latter by the inductive effect of an input signal current flowing through said coil means, said first coil means comprising a plurality of individual windings connected at one end in parallel with said input means and having separate terimnals, a plurality of selectable transfer means, each being connected to one of said terminals, respectively; actuating means for actuating said transfer means in predetermined time sequence in such a manner that by the sequentially actuated transfer means the associated windings of said first coil means are sequentially placed in circuit; and second coil means mounted on said core means for furnishing an output signal corresponding to said input signal when inductively energized by magnetization of said core means by said input signal, whereby during the flow of said input signal through said first coil means a sequence of output signals is inductively produced, the time sequence of said output signals being determined by the time sequence of the actuation of said transfer means.

2. An inductive signal translater device, comprising, in combination, a primary circuit arrangement including, in series, input means for supplying an input signal, first magnetizable core means, first coil means operatively connected with said input means for energization thereby and mounted on said core means for magnetizing the latter by the inductive effect of an input signal current flowing through said coil means, said first coil means comprising a plurality of individual windings connected at one end in parallel with said input means and having separate terminals, a plurality of selectable transfer means, each being connected to one of said terminals, respectively; actuating means for actuating said transfer means in predetermined time sequence in such a manner that by the sequentially actuated transfer means the associated windings of said first coil means are sequentially placed in circuit; second core means magnetically coupled with said first core means; and second coil means mounted on said second core means for furnishing an output signal corresponding to said input signal when inductively energized by magnetization of said first core means by said input signal, whereby during the flow of said input signal through said first coil means a sequence of output signals is inductively produced, the time sequence of said output signals being determined by the time sequence of the actuation of said transfer means.

3. An inductive signal translater device, comprising, in combination, a primary circuit arrangement including, in series, input means for supplying an input signal, magnetizable core means, first coil means operatively connected with said input means for energization thereby and mounted on said core means for magnetizing the latter by the inductive effect of an input signal current flowing through said coil means, said first coil means comprising a plurality of individual windings connected at one end in parallel with said input means and having separate terminals, a plurality of selectable transfer means, each being connected to one of said terminals, respectively; actuating means for actuating said transfer means in predetermined time sequence predeterminedly characterized by preset variation between the time intervals occurring between the actuation of consecutive transfer means in such a manner that by the sequentially actuated transfer means the associated windings of said first coil means are sequentially placed in circuit at times, respectively, determined by the sequence of said intervals; and second coil means mounted on said core means for furnishing an output signal corresponding to said input signal when inductively energized by magnetization of said core means by said input signal, whereby during the flow of said input signal through said first coil means a sequence of output signals is inductively produced, the time sequence of said output signals being determined by the time sequence of the actuation of said transfer means.

4. A signal translater device for translating a single signal into a train of signals of a predetermined pattern, comprising a circuit arrangement including input means for supplying an input signal, a series of first and consecutive transfer units, each of said units including at least one transfer means having an input and an output terminal and being changeable, by application of an input signal, from non-operative to operative condition for transmitting, when in operative condition, via said output terminal an input signal applied to said input terminal thereof, said transfer means further including output means for delivering an output signal corresponding to said input signal simultaneously with the transmission of said input signal between said input and output terminals thereof, connection means serially connecting the output terminal of any one transfer means of said first and of selected consecutive transfer units with the input terminal of a transfer means in a selected consecutive unit in such a manner that a plurality of series-combinations of transfer means forming part respectively of different transfer units is constituted thereby, each series-combination having in reference to the serial sequence of said transfer units a predetermined pattern depending upon the number of transfer means provided in each of the various transfer units of said series thereof, said input means being connected with the input terminal of each of said transfer means that is provided in the first one of said series of transfer units, and sequentially operable control means in circuit with the output terminals of the last ones of the transfer means in said various series-combinations for sequentially placing said various series-combinations in circuit, whereby, during the application of an input signal by said input means to the transfer means of said first transfer unit, a sequence of control signals corresponding to said input signal is delivered by said output means in a predetermined pattern depending upon the number of transfer means in each of said transfer units, and, with respect to time, depending upon the time sequence of said various series-combinations being placed in circuit by operation of said control means.

5. Apparatus for translating single pulses respectively representing individual characters into trains of output pulses respectively corresponding to positional elements of a matrix-type pattern composed of rows and columns containing such elements, the entirety of such elements corresponding to a train of said output pulses constituting the representation of a particular character, comprising, in combination, a plurality of input means for selectively furnishing, in a predetermined sequence, single signal pulses representing respectively individual characters; a plurality of sets of electro-magnetically inductive transducer units, each set corresponding to one of the characters to be represented and being series-connected with that one of said input means which furnishes a signal pulse representing the same character for being energized thereby, each of said units corresponding to one of the columns, respectively, of said matrix-type pattern and comprising the combination of a core member and coil means thereon energizable by said signal pulse, said coil means including a number of windings corresponding to the number of positional elements required in the respective column of the particular character representation and respectively corresponding to these elements, those windings, which, in each set of said column-representing units, correspond to the positional elements required in each row, respectively, of said pattern for the representation of the particular character, being connected in circuit with each other so as to constitute, in each set of column-representing units, a plurality of winding combinations corresponding, respectively, to the positional elements required in the rows of that particular character pattern; selector switch means connected with said winding combinations for selectively and consecutively completing, in each of its positions, a circuit for said signal pulse representing a particular character through said winding combinations, respectively, of the particular set of units; and output means including a plurality of inductive means magnetically coupled with said coil means of said plurality of units, respectively, for receiving, in every operative circuit-closing position of said selector switch means, a group of pulses in parallel depending upon the selection of windings simultaneously placed in circuit in the particular position of said selector switch means, and for delivering consecutively said groups of pulses, whereby the pulses representing the positional elements required for a particular character in each row of the matrix-type pattern are delivered in row-after-row sequence simultaneously and in a distribution among the columns of said pattern as predetermined by the distribution of said windings among the coil means of said sets of units respectively corresponding to a particular character to be represented.

6. An apparatus as claimed in claim 5, wherein said input means comprise record carrier means adapted to carry recordings of character-representing signals, a plurality of sensing means respectively corresponding to different character-representing signals for sequentially sensing said different signals, a plurality of storage means respectively corresponding to the various characters to be represented and connected respectively with said sensing means corresponding to the same character, and distributor means in circuit with said sensing means and said storage means for transmitting each sensed character-representing signal to the corresponding storage means, said individual transducer units being connected respectively with the corresponding storage means.

7. An apparatus as claimed in claim 5, comprising a plurality of printing magnets respectively connected with said plurality of output means for being energized by pulses delivered by said output means consecutively, and, if a group of pulses is simultaneously delivered by more than one of said output means, in parallel with each other in a group respectively corresponding to the group of output means delivering pulses simultaneously.

References Cited in the file of this patent

UNITED STATES PATENTS

| | | |
|---|---|---|
| 2,458,030 | Rea | Jan. 4, 1949 |
| 2,603,705 | Van Duuren | July 15, 1952 |
| 2,620,395 | Snijders | Dec. 2, 1952 |
| 2,643,291 | Potts | June 23, 1953 |
| 2,679,035 | Daniels | May 18, 1954 |
| 2,762,862 | Bliss | Sept. 11, 1956 |
| 2,766,444 | Sheftelman | Oct. 9, 1956 |
| 2,777,745 | McNaney | Jan. 15, 1957 |
| 2,787,416 | Hansen | Apr. 2, 1957 |
| 2,807,005 | Weidenhammer | Sept. 17, 1957 |

OTHER REFERENCES

"High Speed Number Generator Uses Magnetic Memory Matrices," by An Wang, Electronics, May 1953, pp. 200 to 204.